United States Patent [19]
Ashley, Sr. et al.

[11] Patent Number: 4,461,437
[45] Date of Patent: Jul. 24, 1984

[54] TENSION RELEASE

[75] Inventors: Robert J. Ashley, Sr., Southgate; William H. Herrick, Livonia, both of Mich.

[73] Assignee: Brooks & Perkins, Inc., Livonia, Mich.

[21] Appl. No.: 284,053

[22] Filed: Jul. 16, 1981

[51] Int. Cl.³ .............................................. B64C 1/08
[52] U.S. Cl. .................................. 244/137 R; 410/69; 410/78; 410/84
[58] Field of Search ................ 244/137 R, 137 L; 410/32, 69, 79, 84, 85, 89, 92, 105, 78; 104/250; 292/DIG. 49, 53, 48, 46, 47, 26, 30

[56] References Cited

U.S. PATENT DOCUMENTS 3,182,608  5/1965  Mollen ................................ 410/92
3,335,983  8/1967  Mollen et al. ...................... 410/32
4,344,726  8/1982  Naffa ................................ 104/250

Primary Examiner—Robert B. Reeves
Assistant Examiner—Glenn Foster
Attorney, Agent, or Firm—Barnes, Kisselle, Raisch, Choate, Whittemore & Hulbert

[57] ABSTRACT

A cargo lock for aircraft cargo loading such as a pallet, designed for optional tension release, in which a detent and toggle detent are mounted for independent pivotal movement relative to a fixed mount and are connected together by a sheer pin for movement of the detent to cargo release position while the toggle detent remains in locked position. When locked, an over-center toggle device prevents releasing movement of the pivoted toggle detent, and a positive locking cam retains the toggle device in locking position. Step-by-step release is provided for a series of lock units upon incremental movement of an elongated control rod.

20 Claims, 13 Drawing Figures

AIR DROP RELEASE LOAD

UNLATCHING

AFT. RESTRAINT REMOVED

RETRACT DETENTS

TENSION RELEASE

State of the Art

Cargo locking and release devices for the same general purpose as the apparatus of the present invention is known. For example, Mollon et al. U.S. Pat. No. 3,335,983 discloses an aircraft loading and locking system, certain features of which are embodied in the present invention. This patent and co-pending Naffa applications Ser. No. 894,135, filed Apr. 6, 1978, U.S. Pat. No. 4,344,726 issued Aug. 17, 1982, and U.S. Pat. No. 4,372,715 issued Feb. 8, 1983, relating to somewhat similar equipment, are owned by assignee of the present invention.

BRIEF SUMMARY OF THE INVENTION

The problem solved in a superior manner by the structure disclosed herein is the load, unloading, parachute extraction, positive locking and sequential unlocking of air cargo. While the cargo may be in containers, a simplified arrangement is in palletized cargo, in which pallets may be loaded from the after end and moved individually forwardly. The pallets are provided with recesses, usually in the side edges thereof, which receive locking detents which prevent fore and aft movement of pallets. Lateral and vertical movement is prevented by side rails having portions overhanging the edges of the pallets.

The detents may be locked in position in which they extend into pallet recesses. In accordance with the present invention, the pallet engaging detents are retained in locked position by over-center toggle devices. In order to prevent possibility of accidental release of the toggle devices, rigid abutment means are engaged with the pivot connection between links of the toggle.

The rigid abutment means comprises a cam link connected to an arm carried by an elongated rigid control rod, and step-by-step incremental movement of the control rod by an operator provides for sequential actuation of the toggle lock.

In order to provide for optional parachute release of pallets in a manner well understood in the art, each locking detent is mounted for pivotal movement on a pivot mounting which also provides for independent pivotal movement of a toggle detent. The locking detent and the toggle detent are interconnected by a shear pin at a point remote from their common pivot axis. The locking mechanism specifically locks the toggle detent against pivot movement. For parachute releases, when the parachute pull on the pallet attains a predetermined value, the pin shears and the locking detent pivots to release the pallet while the toggle detent remains in locking position.

For conventional unloading, the elongated control rod, which extends the length of the cargo space, is moved incrementally forwardly by an operator, or load master, and at each incremental advance, a single locking device is actuated to unlock the toggle detent. The locking detent and toggle detent are then movable to pallet release position as a unit while coupled by the shear pin or other coupling by the application of a slight force applied to the pallet.

In order to insure proper sequential release of pallets, a cam link and yoke sub-assembly is provided at each station or locking unit, and the dimensions of the elements of the sub-assembly progressively vary to produce the required sequential operation.

DETAILED DESCRIPTION

In the following description the mechanism is referred to as latched or locked. The condition described as the locked condition finds the pallet detent in a recess in the pallet, the detents positively held in this position by the over-center toggle links, and the toggle links held in locking position by the cam links. The mechanism is also locked when the toggle links are in over-center extended position, and retained in this position only by light spring means.

The latched position is that in which the lock detent remains in the associated recess in a pallet, but the toggle linkage has been moved from its extended over-center locking position to a position in which it may be shifted by force applied to the lock detent by a pallet.

As will subsequently appear, the several stations may be sequenced from fully locked to latched condition, and the detents can be fully retracted by operation of a control rod without requiring any pallet movement.

Figures 1, 2:
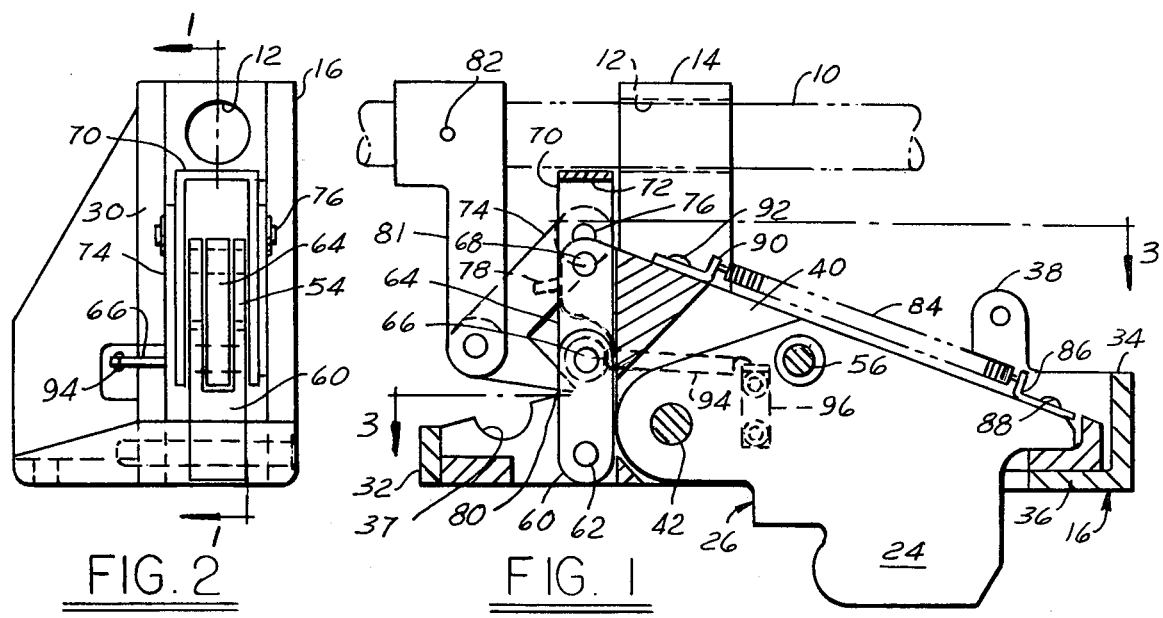
FIG. 1 is a plan view in section along line 1—1, FIG. 2, of a single locking device.
FIG. 2 is an end view of the structure seen in FIG. 1.
Figure 3:
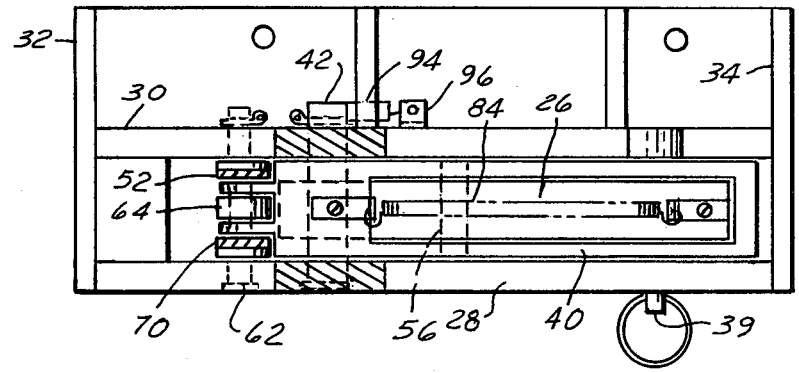
FIG. 3 is a side view, partly in section, of the locking device.

Referring first to FIGS. 1-3, the lock assembly illustrated in detail is one of a plurality of locks located in alignment along one or both sides of an elongated cargo space in an aircraft.

Cargo units may be flat pallets on which cargo is secured or they may be suitable containers. In either case loading of the cargo includes movement of the units on roller means forwardly of the cargo space between rails which prevent lateral movement of the units. The rails are supplemented by structure overlying the edges of the units to prevent upward movement thereof. After a unit has arrived at the position which it is to occupy in flight, detents are pivoted into position to lock the units in place.

Figure 9:
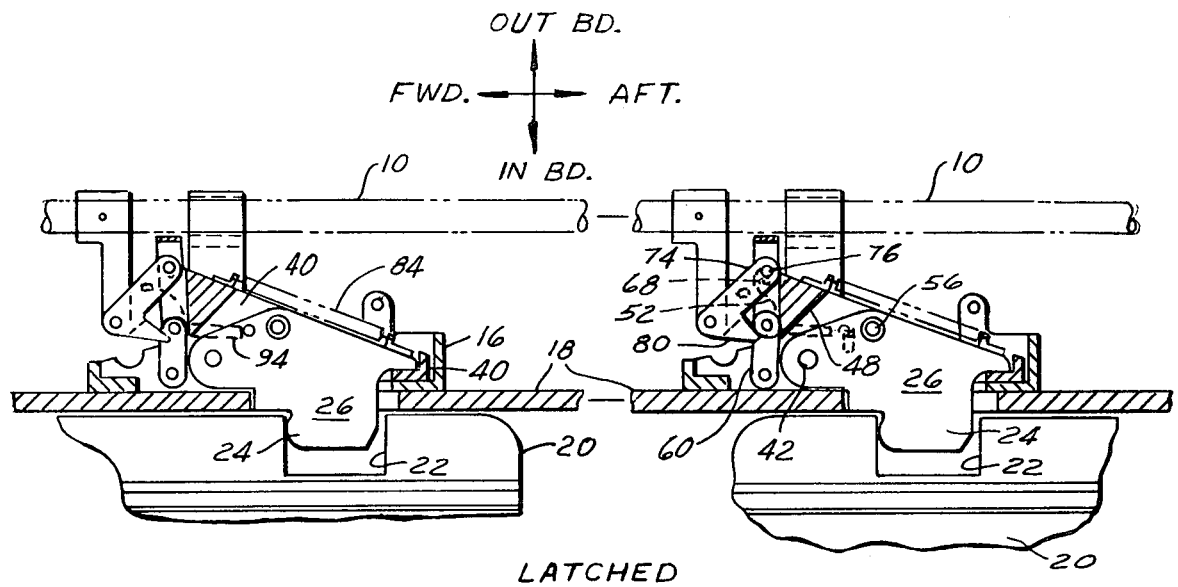
FIGS. 9–13 are a series of diagrammatic plan views of the operative components in different relationship.

Extending longitudinally of the aircraft adjacent the succession of locks is a rigid longitudinally movable control rod 10. Rod 10 is slidable in openings 12 provided in upstanding ears 14 on stationary housings 16 which, as best seen in FIG. 9, are secured in spaced relation along rail 18. Rail 18 prevents lateral movement of load units or pallets 20 which is provided with a recess 22 which receives the lock portion 24 of pivoted lock detent 26.

Figure 10:
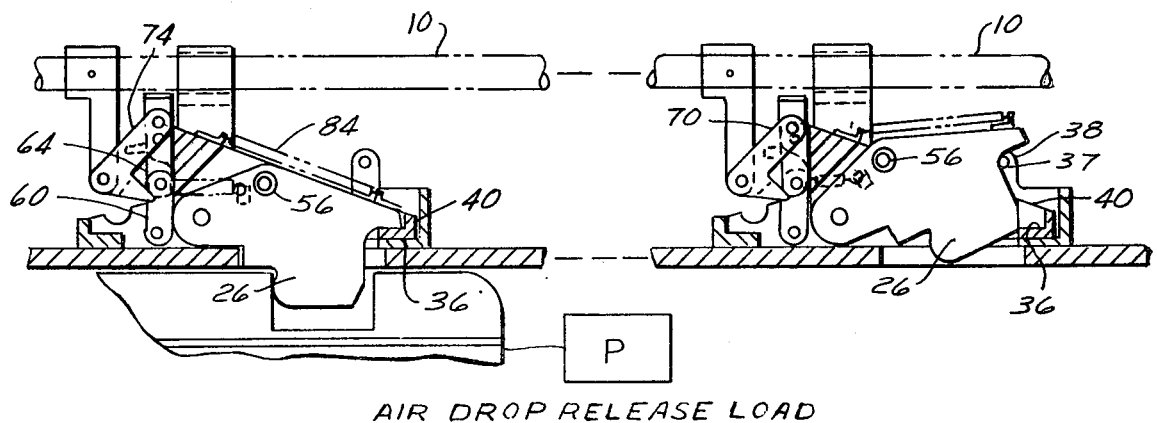

Pallets 20 are connected to parachutes shown diagrammatically at P in FIG. 10. When the parachute is deployed it exerts a strong pull on the pallet to which it is attached, and the cargo lock disclosed herein is intended, when properly set, to release an individual pallet when the pull exerted by the parachute attains a predetermined value.

Stationary housing 16 is fabricated and comprises spaced apart side plates 28 and 30, rigidly connected by cross pieces 32 and 34, the latter having an abutment portion 36 which limits swinging movement of the detents. Plates 28 and 30 are provided with semi-circular recesses 37 to receive circular abutment means carried by a pin which connects toggle links to be described. They are also provided with upstanding posts 38 apertured to receive a pin 39 to retain lock detent 26 in release position for loading.

A detent assembly comprising the lock detent 26 and a toggle detent housing 40 are mounted for simultaneous or independent swinging movement on a detent pivot pin 42. Pin 42 extends through aligned openings in plates 28 and 30, ard the detents 26 and 40 are received between the plates.

Figure 4:
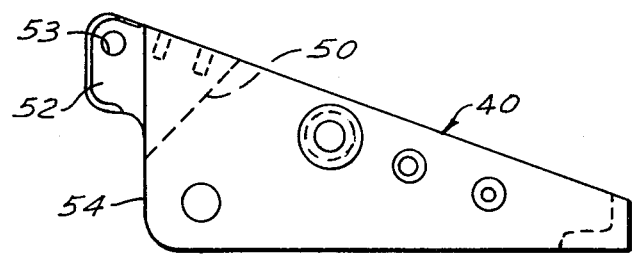
FIG. 4 is a plan view of the pivot housing.
Figure 5:
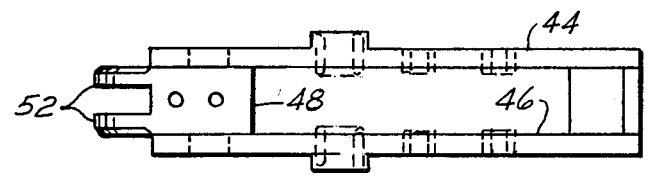
FIG. 5 is a side view of the housing shown in FIG. 3.

The detent 40 comprises a housing, as best seen in FIGS. 4 and 5, including spaced plates 44 and 46 interconnected at one end by an abutment block 48 having an inclined abutment surface 50 which cooperates with lock detent 26 as will later be described. Block 48 also carries two laterally spaced ears 52 having openings 53 which receive a pivot pin for connection to toggle mechanism to be described.

Plates 44 and 46 at their ends adjacent block 48 have abutment surfaces 54 which limit movement of toggle links in over-center position.

The lock detent 26 is received between the plates 44 and 46 of toggle detent 40 and may be coupled thereto by a pin 56. When the locking device is intended for parachute extraction, pin 56 is designed to shear under a predetermined load applied from a parachute connected to the pallet 20 and deployed behind the aircraft from a rear delivery door. The pull on the pallet is applied to the locking portion 24 of lock detent 26, while the toggle detent is locked against movement about pin 42, and a shearing force is applied to pin 56. When this force attains a predetermined value, the pin shears, and lock detent 26 is swung to load release position.

Toggle mechanism is provided to lock the toggle detent in locked position and comprises an outboard link 60 pivoted to stationary pin 62 carried by housing 16, and an inboard link 64 which is pivoted to the outboard link by pin 66. The other end of inboard link 64 is pivotally connected by pin 68 to the ears 52 of toggle detent 40.

Figure 6:
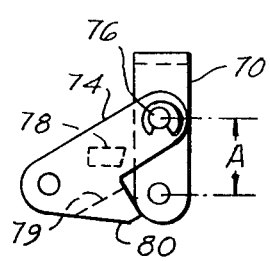
FIG. 6 is a detail view of the cam link-yoke sub-assembly in one limiting position.
Figure 7:
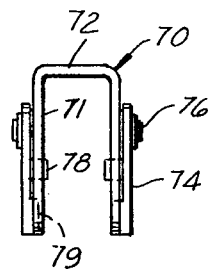
FIG. 7 is a side view of the structure of FIG. 5.

Also pivotally connected to the pin 66 which pivotally interconnects the toggle links 60 and 64 is a release link 70 in the form of a yoke. As best seen in FIGS. 2, 3, 6, 7 and 8, release link 70 comprises spaced parallel arms 71 pivotally connected at their free ends to pivot pin 66, and joined at the other ends by a cross-piece 72. Intermediate the ends of its arms, the release link 70 is pivotally connected to cam links 74 by pivot pins 76. As best seen in FIGS. 6 and 7, cam links 74 have laterally extending abutments 78 which extend into the planes of release link arms 71. In addition cam links 74 are provided with abutments 79 on noses 80 which also extend into the planes of release link arms 71.

Cam links 74 are pivotally connected to rigid arms 81 which are fixed to the control rod 10 as for example by pins 82 vhich extend through openings drilled in the rod after the mechanism of the lock device is in the locked position of FIG. 1. All control arms are properly positioned and permanently fixed to the control rod as described, to insure proper sequential control of the locking mechanism.

Figure 8:
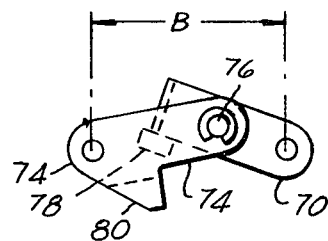
FIG. 8 is a view of the sub-assembly of FIG. 6 in the other limiting position.

In order to insure the sequential control, the toggle cam link and release link sub-assembly illustrated in FIGS. 6–8 are differently dimensioned. In a practical embodiment of the present invention, the dimension A with the parts in the limiting position illustrated in FIG. 6 varies incrementally from 0.937" for the first sub-assembly to 1.562" for the last of a series of eleven locking devices. Similarly the dimension B witb parts in the other limiting position varies incrementally from 2.555" for the first sub-assembly to 3.515" for the last.

Spring means are provided and a detent spring 84 is anchored at one end to a spring clip 86 fastened by screw 88 to the lock detent 26 adjacent its free end. The other end of spring 84 is anchored by spring clip 90 fastened by screw 92 to the toggle detent 40. This spring urges the lock detent 26 to unlocked or pallet release position, relative to the toggle detent.

A light toggle spring 94 extends between an extension of toggle pin 66 as best seen in FIGS. 1–3, and a spring clip fixed to the outboard side of housing plate 30. This urges the toggle links 60 and 64 to the over-center position in which they prevent movement of the toggle detent in a release or unlocking direction. The action of this spring is not in any way the equivalent of the positive blocking of the pivot connection at 66 by the nose abutment 79 engaging the abutment surface at the pivot connection between toggle links 60, 64.

Referring now to FIG. 9 there is shown more or less diagrammatically the position of parts of the locking device when the pallets are in positively locked condition. In this figure, which shows two adjacent locking devices, the lock portions 24 of both lock detents 26 extend into recesses 22 in the side edges of pallets 20. The toggle links are in over-center blocking position against block 48 of the toggle detent 40, and prevent counterclockwise swinging of toggle detent by engagement with ears 52 at pivot pin 68. The center pivot of the toggle links 60, 64 is rigidly engaged by the nose 80 of cam link 74. Pin 56 rigidly couples toggle detent 40 and lock detent 26, so that until the toggle is broken, the lock detent is positively retained in locking position.

In this figure, spring 94 urges toggles toward over-center blocking position, but the toggles are positively blocked by cam link 74. Spring 84 urges lock detent 26 upwardly as seen in the figure, which movement is blocked by coupling pin 56.

FIG. 10 shows two locking devices, the aftermost of which, seen at the right, has released a pallet which has been pulled away from the locking device by parachute extraction. In this figure the toggle detent remains in its locking position in which its free end rests on abutment 36. It is assumed that the pull exerted by the parachute was sufficient to shear the pin 56, and to swing lock detent 26 to the illustrated position. Lock detent 26 is retained in retracted position by spring 94 urging the toggle links toward extended position, and spring 84.

The pallet 20 seen at the left of this figure, is still retained since the pin 56 has not been sheared, and the toggle detent 40 is locked in position by the toggle links 60, 64, which are held in over-center position by cam link 74. When the parachute attached to this pallet is deployed and the pull exerted by the parachute attains a predetermined magnitude, the pin will shear and the parachute will extract the pallet from the airplane and permit it to reach the ground.

Figure 11:
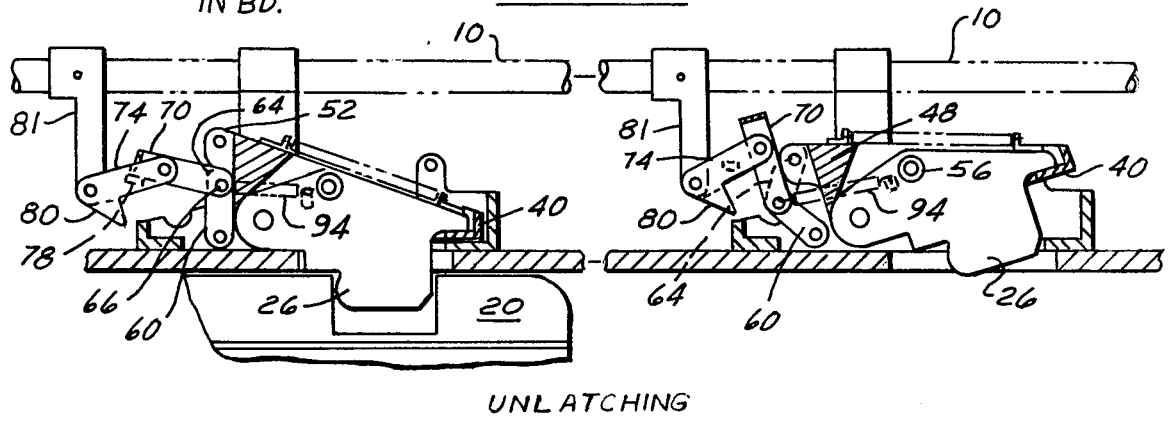
Figure 12:
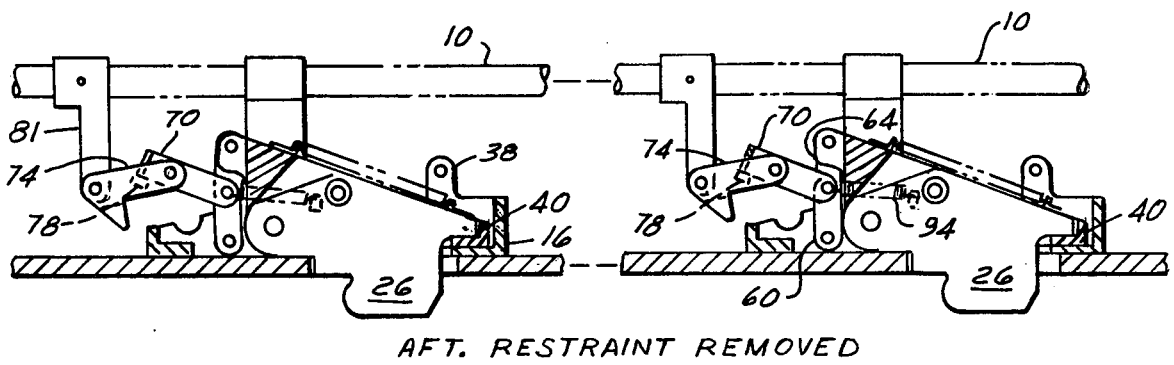

In FIGS. 11 and 12 there is illustrated sequential detent unlatching by incremental advance of control rod 10.

As seen at the left of FIG. 11, the forward one of the two pallets 20 illustrated is still locked in place, since ears 52 of toggle detent 40 are blocked by toggle links 60, 64, which are in over-center position. It will be noted in this case however that release link 70 has been swung counterclockwise by cam link 74 to a limiting position determined by engagement with stop 78 on cam link 74 so that further forward movement of rod 10 and arm 81 will move center toggle pin 66 to the left, thus moving the toggle link over-center to the left to an unlocked position.

As seen at the right of this Figure, toggle detent 40 with lock detent 26 coupled thereto by pin 56 has been moved to unlocked position. The sequential operation is the result of differently dimensioned release and cam links 70, 74, and in both lock stations illustrated in this Figure, it will be observed that the blocking nose 80 of cam link 74 has been swung away from blocking proximity to toggle pivot 66.

As the rod 10 is progressively incrementally shifted forwardly, the pallet locks are released or unlatched sequentially as seen in FIG. 12 from the aftermost lock forwardly. At each station, the cam link and release link are rotated and initial movement removes the bearing of the cam link on yoke at the center pivot of the toggle links. The toggle spring maintains the links in latched condition as seen at the left in FIG. 11 until the cam and release links 74, 70 exert a pull at the center toggle pivot 66.

When the aftermost lock control linkage has rotated to a point where release link 70 bears on stop 78 of cam link 70, a coupling is effected which pulls toggle links center pivot to over-center unlatched condition.

At this time, lock detent 26 is maintained in blocking position but only by the action of toggle spring 94, which holds links 60, 64 near to aligned centered position. The lock detent at this time may be moved out of pallet blocking position to the clearance position seen at the right in FIG. 11 by the application of minimum force on the associated pallet by a crew member.

Since each succeeding lock has a progressively longer travel of the control linkage to effect coupling, the unlocking proceeds from aft forwardly sequentially.

It will be noted from the position of parts in the right hand lock of FIG. 11 that it is assumed that after positive unblocking of the toggle pivot followed by movement of toggle links over-center in an unlocking direction, lock detent 26 has been swung to clearance position by movement of the pallet, in which the detent is rotated outboard, and the toggle and control links rotate freely to the illustrated position without transmitting force to control arm 81.

FIG. 12 shows the locks in an intermediate position in which rod 10 has moved cam link 74 and release link 70 to the position in which the release link 70 has engaged abutment 78 and has pulled the center pivot 66 of the toggle links slightly over center into an unlatched position. Further movement of rod 10 would move detents into unlocking position. However, with the parts as seen in FIG. 12, a force applied to the lock detent by rearward movement of the pallet will swing the lock detent counterclockwise, collapsing toggle links 60 against spring 94, and collapsing cam link 74, and release link 70 to the position seen at the left in FIG. 11. When the pallet clears the station, toggle spring 94 will restore the parts to the position seen in FIG. 12.

Figure 13:
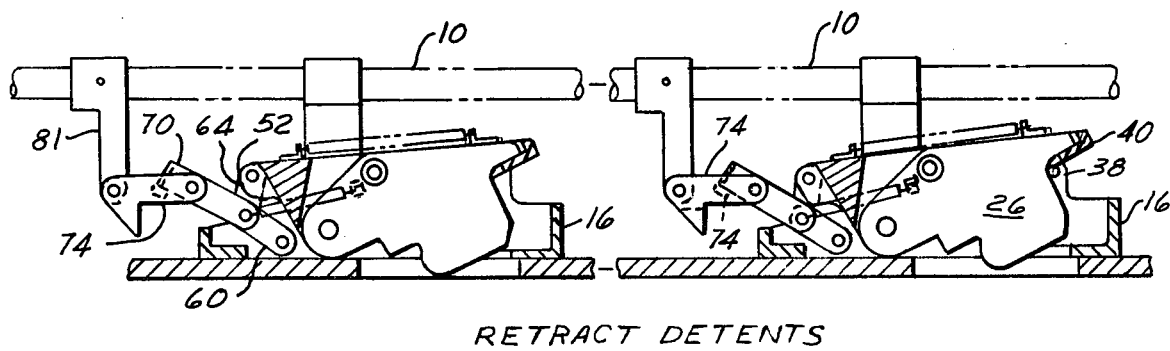

Referring now to FIG. 13, there is illustrated movement of the detents to full clearance position by movement of the control rod 10. The detents 26, 40 as seen at the right of FIG. 12, have been moved to fully unlocked position and if desired may be retained in this position by insertion of a pin in the aligned apertures in posts 38.

The action illustrated in FIG. 13 differs from that illustrated in FIGS. 11 and 12 in that the detents are fully retracted only by continued forward movement of control rod 10 beyond the positions illustrated in FIGS. 11 and 12. In FIG. 11 the movement of rod 10 has unlatched the device by movement of the toggle links back over-center from their over-center locked position. The locking detent however has its locking portion remaining in pallet recess 22, as illustrated at the left of this Figure. In FIG. 3, further movement of rod 10 is shown as fully retracting the lock detent independently of any movement of a pallet, or in fact without requiring a pallet to be in position.

At the station shown at the left in FIG. 13, the toggle detent 40 is shown as fully retracted from the pallet, although not clearing the openings in posts 38 which receive the lock-out pin. This is not required, since insertion of the pin is manual, and the operator simply lifts toggle detent 40 slightly to clear the openings.

An important function of the apparatus is sequential locking of pallets from forward aft. As the rod 10 is moved aft by the operator, the extended toggle spring 94, as well illustrated in FIG. 12 will straighten toggles 60 and 64 to the extent permitted by links 70, 74, which in turn will pivot detents 26, 40 to locking position. If no interference develops, spring 94 will move toggle links into the over-center latched position. However, if the lock detent does not move fully into a pallet recess, toggle links 60 and 64 do not move to fully latched position. As the cam link moves toward fully locked position, it moves the center pivot conection of the toggle links over-center into latched position and then assumes the fully locked position illustrated in FIG. 9. If the lock detent cannot move into its fully locked position, rod 10 cannot reach its forward limiting position and this serves as an indication to the operator that a particular locking device has not positively locked the associated pallets in place.

From the foregoing it will be apparent that the detent housing 40 when retained in locking position, supports end portions of the shear pin 56, while the detent 26 applies shearing force to the pin at the zones between adjacent sides of detent 26 and plates 44, 46. Accordingly, when housing 40 is retained in locking position by toggle links 60, 64, detent 26 is retained in locking position until the force applied to the detent by the cargo container reaches a predetermined value, at which time the pin 56 is sheared, and the cargo container is released for parachute extraction.

On the otherhand, with pin 56 in place, the detent housing may be blocked against pivotal movement from locking to release position by toggle links 60, 64. Alternatively, it may be released for pivotal movement toward release position by movement of toggle links over center from blocking position, upon application of minimal force only sufficient to overcome spring 94. Further, movement of rod 10 results ultimately in movement of detent housing 40 and detent to the fully retracted release position of FIG. 13.

I claim:

1. A cargo lock for slidable cargo comprising a support housing, a detent pivoted to said housing for movement between locking and unlocked positions, pivotally interconnected over-center toggle links connected between said support and detent, a release link pivotally connected to the pivot connection between said toggle links, and a cam link pivotally connected to said release link and having a camming abutment portion thereon, actuating means for moving said cam link between a position in which said cam link and said release link operate as tension means to pull the pivot connection between said toggle links away from their over-center blocking position and a limiting position in which the camming abutment portion of said cam link positively engages the pivot connection between said toggle links to block movement of said toggle links out of their over-center position.

2. A lock as defined in claim 1 in which said cam link and said release link have an intermediate position in which they move the pivot connection between said toggle links slightly beyond center from their over-center locking position to provide for movement thereof by force applied thereto by said detent.

3. A lock as defined in claim 2, in which said cam link and said release link have a second limiting position in which they pull the pivot connection between said toggle links to a substantially fully collapsed condition in which the connection between said toggle linkage and said detent moves said detent to a fully retracted position.

4. A lock as defined in claim 3, in which a light spring connects the pivot connection between said toggle links to said support and serves to urge said toggle links toward over-center locking position, said spring being yieldable to allow collapse of said toggle as a result of forces applied to said detent by the cargo, and effective thereafter to return said detent to its locking position.

5. A lock as defined in claim 3, in which said detent comprises a locking detent and a toggle detent, single pivot means mounting both detents for simultaneous or independent swinging movement, and a shear pin coupling said lock detent and said toggle detent to provide for parachute loading applied to said lock detent to swing said lock detent to cargo release position while said toggle detent remains latched.

6. A cargo lock comprising a stationary support housing having spaced side plates, an elongated toggle detent having spaced side plate interconnected by spacing abutments at the ends thereof, a first pivot connection at one end of said toggle detent for pivotal mounting to said housing, a second pivotal connection spaced from said first connection for connection to toggle linkage, a pair of over-center toggle links connected between said second pivotal connection and said housing adapted in extended over-center condition to maintain said toggle detent in locking position, a lock detent received between the plates of said toggle detent and having a pivot connection in alignment with the first pivot connection of said toggle detent to provide for simultaneous or independent pivotal movement of both of said detents relative to said housing, and a pin coupling said detents.

7. A cargo lock as defined in claim 6 in which said pin is a shear pin which provides for independent pivotal movement of said lock detent when said pin is sheared while said toggle detent remains in locked position.

8. A cargo handing system comprising a plurality of locks aligned at a side of an elongated stowage area over which a plurality of cargo units are slidable, each lock comprising a support, a detent pivoted to said housing for movement between locking and unlocked positions, pivotally interconnected over-center toggle links connected between said support and detent, a release link pivotally connected to the pivot connection between said toggle links, and a cam link pivotally connected to said release link and having a camming abutment portion thereon, actuating means for moving said cam link between a position in which said cam link and said release link operate as tension means to pull the pivot cennection between said toggle links away from their over-center blocking position and a limiting position in which the camming abutment portion of said cam link positively engages the pivot connection between said toggle links to block movement of said toggle links out of their over-center position.

9. A system as defined in claim 8, in which actuating means comprises a plurality of arms fixed to a rigid control rod extending along the assembly of aligned lock, each of said arms being pivotally connected to a cam link of one of said locks.

10. A system as defined in claim 9, said release links and said cam links being progressively differently dimensioned to provide for sequential operation of said locks by movement of said control rod.

11. A system as defined in claim 10, in which movement of said control rod in one direction pivots said release links and said cam links to move said toggle links into over-center locking position and thereby to move said detents into locked position and to engage the camming abutments of said cam links with the center pivots between said toggle links.

12. A system as defined in claim 11, which comprises means for moving said control rod to effect sequential operation of said locks as aforesaid, whereby if any detent fails to properly lock its associated cargo unit, said rod cannot be moved to a limiting position which it occupies when all detents are properly locked.

13. A system as defined in claim 12, in which said rod is incrementally shiftable to provide sequential operation of said locks.

14. A cargo handling system comprising a plurality of locks positioned in alignment at one side of an elongated cargo area adapted to receive a plurality of cargo units slidable longitudinally of the cargo area, each lock comprising a stationary support, a detent pivoted to said support and movable between a retracted position and a locking position in which said detent engages a cargo unit, a pair of toggle links connected directly between said detent and said support, a pivot connection between said toggle links, a control rod extending along the aligned locks, actuating means including an arm rigidly fixed to said rod adjacent each lock, cam link and release means connected between said arms and the adjacent pivot connections between said toggle links operable upon movement of said rod to a first limiting position to swing the associated detents into engagement with the adjacent cargo units and to positively lock said detents against accidental release, said actuating means being arranged to provide for sequential movement of said detents into locking engagement with the associated cargo units, whereby movement of said rod to said first limiting position is prevented if one detent fails to properly engage its cargo unit and serves as an indication that locking of all detents has not been effected.

15. A system as defined in claim 14, in which said rod and actuating mechanism is arranged such that movement of the rod in the other direction first unlatches all of said locks sequentially to permit movement of the detents to retracted position by forces applied to said cargo units.

16. A system as defined in claim 15, in which said mechanism is arranged such that further movement of said rod in said other direction moves all of said detents sequentially to retracted position.

17. A tension release lock for cargo containers slidably supported in an aircraft for discharge from a rear door by force applied by a parachute deployed behind the aircraft in flight and connected to the cargo container, said lock comprising a stationary support fixed to the aircraft, a detent pivoted to said support and movable from a locking position in which said detent engages a cargo container and prevents rearward movement thereof while rearwardly directed force applied to the container causes said container to bias said detent for pivotal movement toward release position, a shear pin extending transversely of the plane of movement of said detent and directly engaged thereby, pin support means supporting said pin against movement by said detent and engaged by said pin, said pin support means and said detent together directly engaging closely spaced portions of said pin and applying a shear force to a portion of said pin intermediate said closely spaced portions, upon application of rearwardly directed force to said container, whereby said detent and pin support means apply a shearing force to said pin, said detent being freed for swinging movement to release position upon failure of said pin in shear.

18. A lock as defined in claim 17, in which said pin support means and said detent together support end portions of said pin and apply a shear force to an intermediate portion thereof.

19. A tension release lock for cargo containers slidably supported in an aircraft for discharge from a rear door by force applied by a parachute deployed behind the aircraft in flight and connected to the cargo container, said lock comprising a stationary support fixed to the aircraft, a detent pivoted to said support and movable from a locking position in which said detent engages a cargo container and prevents rearward movement thereof while force applied to the container causes it to bias said detent for pivotal movement toward release position, a detent housing pivoted to said support for pivotal movement about the pivot axis of said detent, selectively operable means (a) for locking said detent housing against pivotal movement from locking position, (b) for releasing said detent housing for pivotal movement with said detent in detent release direction upon application of minimal forces to said detent by a cargo container, and (c) for positive movement of said housing to detent release position, said detent and detent housing having pin-receiving openings in alignment when both said detent and housing are in locking position, and a shear pin received in said openings operable to be sheared upon application of a predetermined force to said detent by a cargo container while said housing is in locking position.

20. A lock as defined in claim 19, in which said housing comprises a pair of laterally spaced plates and said detent is pivotally movable between said plates so as to apply shearing action to said pin at two zones between said detent and said plates.

* * * * *